(12) United States Patent
Ota

(10) Patent No.: US 9,172,206 B2
(45) Date of Patent: Oct. 27, 2015

(54) FIBER LASER SYSTEM

(71) Applicant: CANON KABUSHIKI KAISHA, Tokyo (JP)

(72) Inventor: Takefumi Ota, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/839,795

(22) Filed: Mar. 15, 2013

(65) Prior Publication Data

US 2014/0269792 A1    Sep. 18, 2014

(51) Int. Cl.
| | |
|---|---|
| H01S 3/10 | (2006.01) |
| H01S 3/11 | (2006.01) |
| H01S 3/067 | (2006.01) |
| H01S 3/00 | (2006.01) |
| H01S 3/30 | (2006.01) |
| G02F 1/35 | (2006.01) |

(52) U.S. Cl.
CPC ............... *H01S 3/11* (2013.01); *H01S 3/0057* (2013.01); *H01S 3/06725* (2013.01); *H01S 3/06754* (2013.01); *H01S 3/10015* (2013.01); *H01S 3/302* (2013.01); *G02F 1/3513* (2013.01); *H01S 3/10023* (2013.01); *H01S 2301/085* (2013.01)

(58) Field of Classification Search
CPC ..... H01S 3/094046; H01S 3/00; H01S 3/302; H01S 3/108; H01S 3/0057; H01S 5/0057; H01S 3/06725; H01S 3/0811; H01S 3/0823
USPC .......................................................... 372/25
See application file for complete search history.

(56) References Cited

U.S. PATENT DOCUMENTS

| | | | | |
|---|---|---|---|---|
| 5,283,795 | A * | 2/1994 | Fink | 372/32 |
| 6,339,602 | B1 | 1/2002 | Goto | |
| 6,590,910 | B2 * | 7/2003 | Lin | 372/18 |
| 6,813,429 | B2 * | 11/2004 | Price et al. | 385/125 |
| 7,202,993 | B2 * | 4/2007 | Tauser et al. | 359/326 |
| 7,593,434 | B2 * | 9/2009 | Liu et al. | 372/6 |
| 7,630,416 | B2 * | 12/2009 | Hong et al. | 372/13 |

(Continued)

FOREIGN PATENT DOCUMENTS

| | | |
|---|---|---|
| JP | H01-233416 A | 9/1989 |
| JP | H09-307175 A | 11/1997 |
| JP | 2000-214504 A | 8/2000 |
| JP | 2006-229080 A | 8/2006 |
| JP | 2006-518866 A | 8/2006 |
| JP | 2012-103716 A | 5/2012 |

OTHER PUBLICATIONS

Norihiko Nishizawa and Toshio Goto, IEEE Photonics Technology Letters, vol. 11, No. 3, Mar. 1999 Title: Compact System of Wavelength-Tunable Femtosecond Soliton Pulse Generation Using Optical Fibers.

(Continued)

*Primary Examiner* — Xinning Niu
*Assistant Examiner* — Vu A Vu
(74) *Attorney, Agent, or Firm* — Canon USA, Inc. I.P. Division

(57) ABSTRACT

A laser system includes a seed laser configured to generate a plurality of optical pulses; a controller configured to receive the plurality of the optical pulses and obtain chirped pulses, each chirped pulse having a chirping amount different from each other; an optical waveguide, having a characteristic of anomalous dispersion, configured to cause soliton self-frequency shifts while the chirped pulses propagating so that each center wavelength of a pulse which output from the optical waveguide is different from each other.

15 Claims, 16 Drawing Sheets

(56) References Cited

U.S. PATENT DOCUMENTS

| | | | |
|---|---|---|---|
| 7,782,912 B2* | 8/2010 | Harter et al. | 372/6 |
| 8,126,299 B2* | 2/2012 | Ramachandran | 385/28 |
| 2005/0105865 A1 | 5/2005 | Ferman | |
| 2005/0226278 A1* | 10/2005 | Gu et al. | 372/6 |
| 2006/0120412 A1 | 6/2006 | Liu | |
| 2010/0086251 A1* | 4/2010 | Xu et al. | 385/1 |
| 2011/0280262 A1 | 11/2011 | Ferman | |
| 2013/0034115 A1 | 2/2013 | Prawiharjo | |

OTHER PUBLICATIONS

DongKyun Kang, Dvir Yelin, Brett E. Bouma, Guillermo J. Tearney, Spectrally-Encoded Color Imaging, Optics Express 17(17):15239-15247, Aug. 13, 2009, The Optical Society, Washington, D.C, 2009.

P. L. Stoffa, J. T. Fokkema, R. M. de Luna Freire, W. P. Kessinger, Split-Step Fourier Migration, Geophysics, 5(4):410-421, Apr. 1990, Society of Exploration Geophysicists, Tulsa, OK, 1990.

F. Tauser et al., "Widely tunable sub-30-fs pulses from a compact erbium-doped fiber source", Optics Letters, Optical Society of America, US, vol. 29, No. 5, Mar. 1, 2004, pp. 516-518.

S .N. Li, H. P. Li, Q. M. Wang, J. K. Liao, X. G. Tang, R. G. Lu, Y. Liu, Y. Z. Liu, Numerical Simulation on Spectral Compression of Frequency-Shifting Femtosecond Pulses in Photonic Crystal Fiber, Proceedings of SPIE, 2011 International Conference on Optical Instruments and Technology: Optoelectronic Devices and Integration, Dec. 5, 2011, vol. 8198, Article 81980O, pp. 81980O-1-81980O-6, SPIE, Bellingham, WA, 2011.

Communication from European Patent Office for European Patent Application No. 14157896.3, European Patent Office, Dec. 16, 2014.

Notification of Reasons for Refusal from Japan Patent office in Japanese Patent Application No. 2014-053958, dated Feb. 6, 2015.

* cited by examiner

FIBER LASER SYSTEM

BACKGROUND OF THE INVENTION

1. Field of the Invention

The present disclosure is related to a pulsed laser system.

2. Description of the Related Art

Nishizawa et al. disclosed a compact system of wavelength-tunable femtosecond (fs) optical pulse source by using an optical fiber in a reference (Norihiko Nishizawa and Toshio Goto, IEEE PHOTONICS TECHNOLOGY LETTERS, VOL. 11, NO. 3, MARCH 1999). According to Nishizawa et al., soliton pulses are generated in the optical fiber, and the wavelength of the soliton pulses can be linearly shifted by varying merely the input power of the pulse laser which is input into the fiber.

To modulate the input power of the pulse laser, however, causes loss of the power.

SUMMARY OF THE INVENTION

Embodiments of the present invention provide a fiber laser system.

According to an aspect of the present invention, it is provided that a fiber laser system includes a seed laser configured to generate a plurality of optical pulses; a controller configured to receive the plurality of the optical pulses and obtain chirped pulses, each chirped pulse having a chirping amount different from each other; an optical waveguide, having a characteristic of anomalous dispersion, configured to cause soliton self-frequency shifts while the chirped pulses propagating so that each center wavelength of a pulse which output from the optical waveguide is different from each other.

Further features of the present invention will become apparent from the following description of exemplary embodiments with reference to the attached drawings.

DESCRIPTION OF THE EMBODIMENTS

Embodiments according to the present invention will be described below with reference to the attached drawings.

Soliton pulses are pulses with a certain balance of nonlinear and dispersive effects occurred in an optical waveguide, such as a fiber glass. A temporal and spectral shape of a short optical pulse changes during propagation in an optical waveguide due to Kerr effect and chromatic dispersion. Under certain circumstances, however, those effects can exactly cancel each other so that the temporal and spectral shape of the pulses is preserved even after long propagation.

According to balance between the non-linear effect (Kerr effect) and anomalous dispersion, the soliton pulse doesn't change its own shape even after the long propagation. This is called as a soliton effect.

The soliton effect is described as follows.

$$N = \sqrt{\frac{\gamma P_0 T_{FWHM}^2}{3.11 \cdot |\beta_2|}} \approx 1$$

$\gamma$ is a nonlinear coefficient, $\beta_2$ is group velocity dispersion (GVD), $P_0$ is a pulse peak power and $T_{FWHM}$ is a pulse temporal width, respectively. In order to get the soliton effect, the optical waveguide needs to have a characteristic of anomalous dispersion for input pulses. N is Soliton order which can be 1, 2, or 3, other integral numbers.

In addition to the soliton effect, when a Raman-effect is induced during the propagation, the center wavelength of soliton pulse can be shifted to longer, which is called Soliton Self-Frequency Shift (hereinafter, which is called SSFS). The amount of the wavelength shift depends on the pulse energy, the amount of nonlinear effect, material of waveguide, and the length of the waveguide.

Nishizawa et al. changed the pulse energy and the peak power of the input pulse by an intensity modulator in order to achieve the soliton self-frequency shift (SSFS).

On the other hand, in this embodiment the soliton self-frequency shift can be achieved by changing a shape of the input pulse. The shape of the input pulse can be controlled based on the amount of chirping added into the input pulse.

Figure 1:
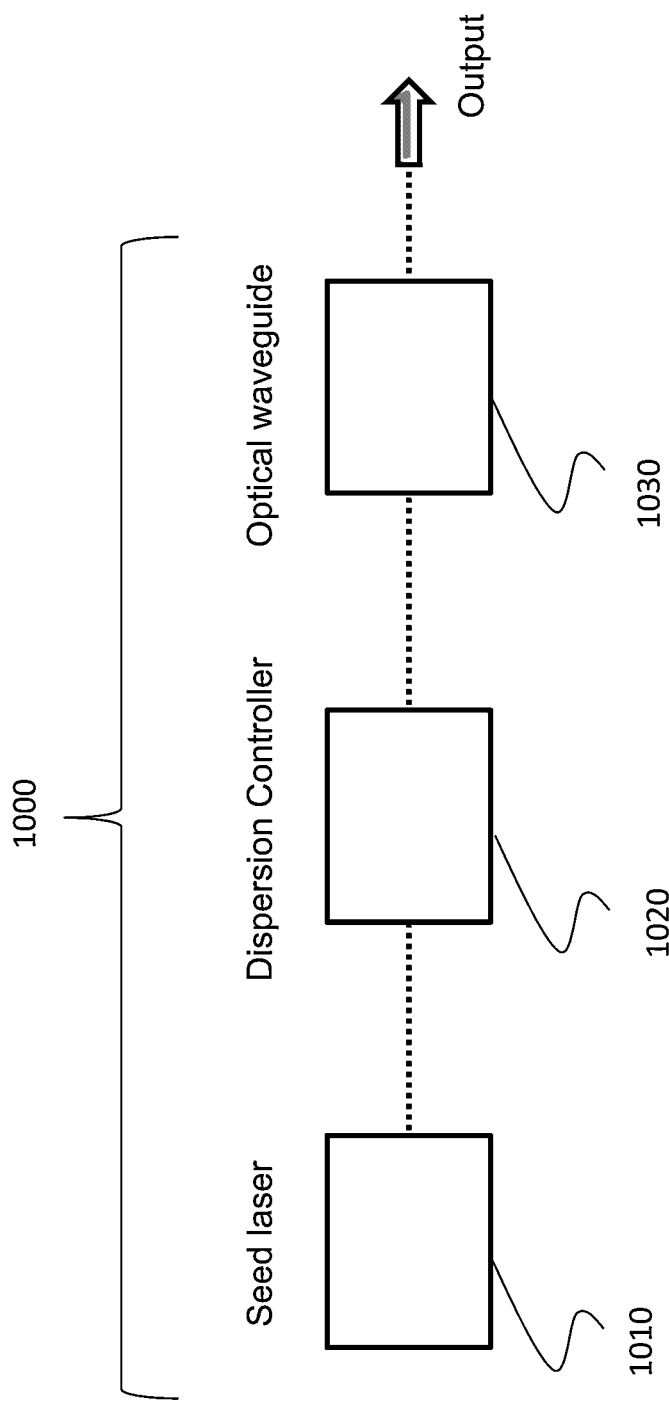
FIG. 1 illustrates a fiber laser system including a seed laser, a dispersion controller, and an optical waveguide related to a first embodiment of the present invention.

An optical fiber laser system 1000 is illustrated in FIG. 1. The system 1000 includes a seed laser 1010, a dispersion controller 1020, and an optical waveguide 1030.

The seed laser 1010 is, for example, a mode-locked fiber laser used in order to input an optical pulse into the dispersion controller 1020. The average power from the seed laser (pulse laser) is set at 50 mW, for example, when the chirped pulse is connected to the waveguide. The repetition rate may be 40 MHz, a center of wavelength may 1560 nm, and a spectral width may 10 nm.

The dispersion controller 1020 as a pulse controller or a chirp modulator is used for obtaining chirped pulses. The chirped pulse has a plurality of phase delay which are different every frequency (or wavelength). The chirped pulse obtained by the controller 1020 may be an up-chirped pulse. A pulse generated by the seed laser 1010 will be chirped by the dispersion controller 1020. The controller 1020 can control the amount of chirping which to be applied to the input pulse from the seed laser 1010, and is also can change the pulse shape.

The optical waveguide 1020 is an optical fiber which is, for example, a polarization maintaining single mode fiber (PM-SMF). The dispersion β2 is −20.4 [ps^2/km], a mode field diameter (MFD) is 10 um, and the length of the fiber is 15 m.

Figure 2:
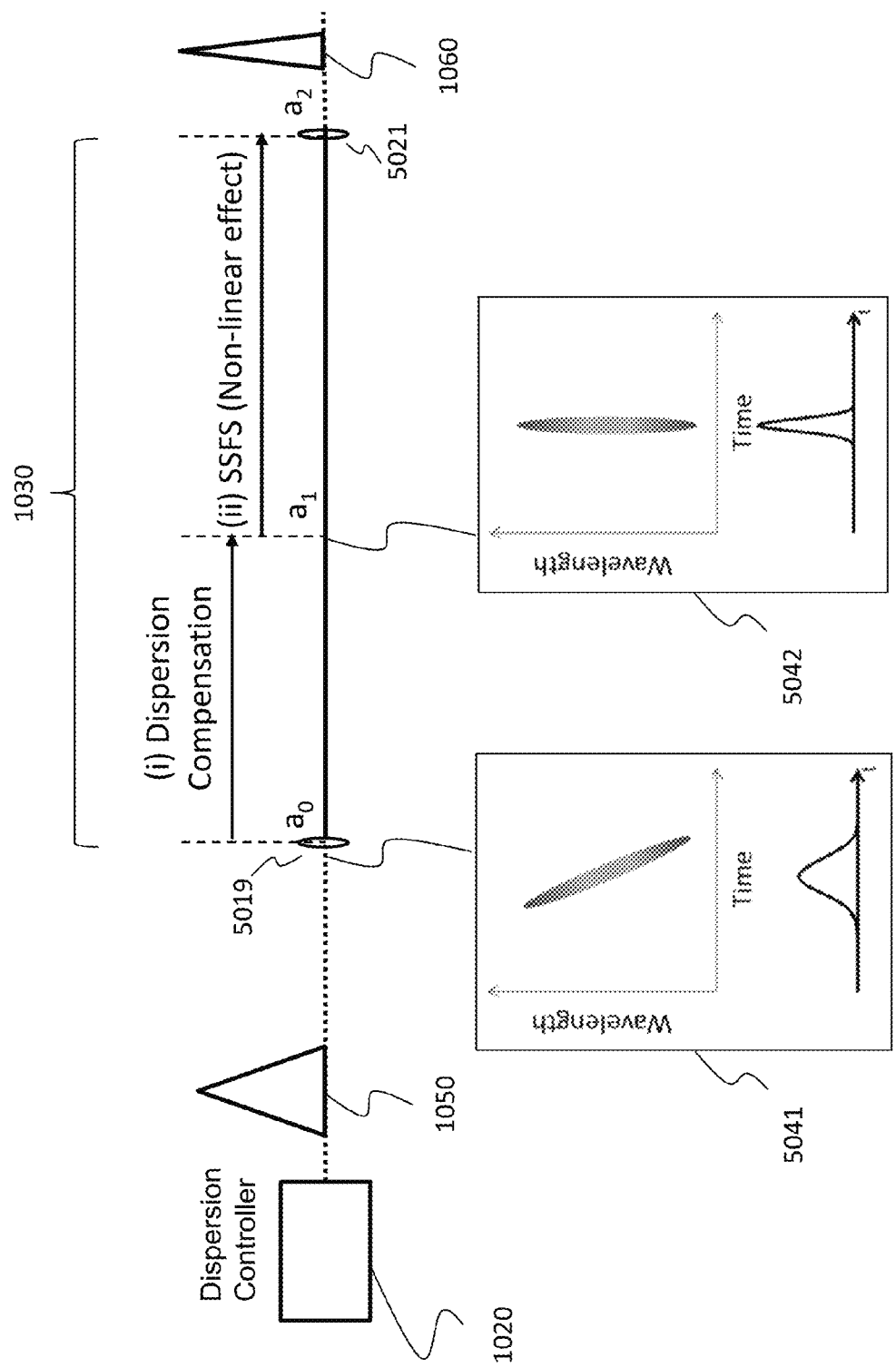
FIG. 2 illustrates a chart to describe (i) dispersion compensation period, and (ii) a non-linear effect period.

As illustrated in FIG. 2, an output pulse 1050, which is chirped by the dispersion controller 1020, propagates to the optical waveguide 1030 through a lens 5019. Since the waveguide 1030 is designed to have a characteristic of anomalous dispersion in this embodiment, the up-chirped pulses 1050 due to normal dispersion of the controller 1020, which is illustrated in a chart 5041, are compensated with the anomalous dispersion of the waveguide 1030 between $a_0$ and $a_1$ as propagating in the waveguide 1030. A period (i) in FIG. 2 is a dispersion compensation period. During the period (i), the input pules can receive down-chirping due to the characteristic of the anomalous dispersion. The chirp of an optical pulse is usually understood as the time dependence of its instantaneous frequency. Specifically, an up-chirp (down-chirp) means that the instantaneous frequency rises (decreases) with time.

After the completion of the dispersion compensation, the pulse 1050 becomes a deformed pulse as illustrated in a chart 5042.

When the peak power of pulses is enough to induce the soliton effect and Raman-effect, the soliton self-frequency shift (SSFS) can be observed between $a_1$ and $a_2$. SSFS is observed in a period (ii) in FIG. 2 as a non-linear effect.

While the pulse propagating in the waveguide 1030, the dispersion compensation and a non-linear effect occur and the pulse is output as an output pulse 1060 through a lens 5021.

It may be difficult to know precisely the boundary $a_1$ between (i) the dispersion compensation process period and (ii) SSFS process period, but the shift amount of the SSFS depends on the length of the period of the non-linear effect. In short, if the length of the period of the non-linear effect can be varied, it means the center of the wavelength of the output pulse 1060 can be changed.

Figure 3:
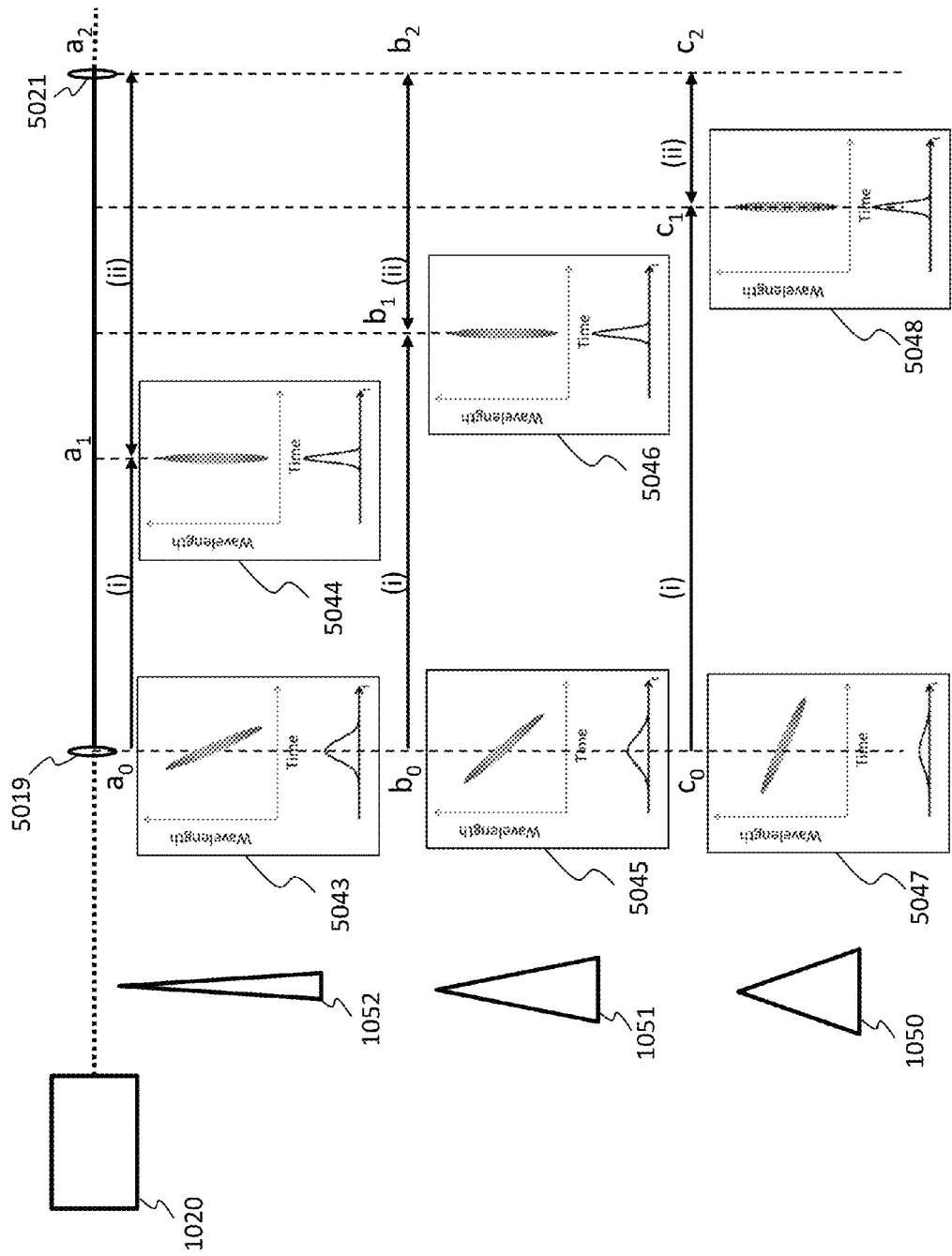
FIG. 3 illustrates three pulses whose shapes different from each other and their propagation.

To change the length of the period (ii) of the non-linear effect in one length of the optical waveguide 1030, a shape of the chirped pulse which is formed by the dispersion controller 1020 will be changed. As illustrated in FIG. 3, depending on the shapes 1052, 1051, and 1050 of the pulses output from the dispersion controller 1020, the periods (i) and (ii) can be changed while the total length of the periods maintaining. To change the shape of the chirped pulse can mean changing the amount of chirping.

In FIG. 3, after the compensation period (i), the chirped pulse 1052, 1051, and 1050 as described by charts 5043, 5045, and 5047 will be deformed as illustrated in 5044, 5046, and 5048, respectively.

As the amount of normal dispersion, which is given by chirping, is changed as described in the charts 5043, 5045, and 5047, the length from a portion where the soliton effect and Raman-effect can be occurred to an end of the waveguide 1030 will be changed. Thus, the amount of SSFS will become different depending on the added normal dispersion. In other words, the amount of SSFS can be changed by chirping.

When the amount of chirping in the pulse is changed, the shape of the pulse is also controlled. At this system 1000, there is no need to change the energy of the pulse.

The chirped pulses 1052, 1051, or 1050) are coupled into the waveguide 1030. In the waveguide 1030, the soliton effect and a Raman effect are stimulated. By these effects, the wavelengths of the pulses are tuned and the center wavelength of the pulse can be different by the amount of the chirp in pulses.

Figure 4:
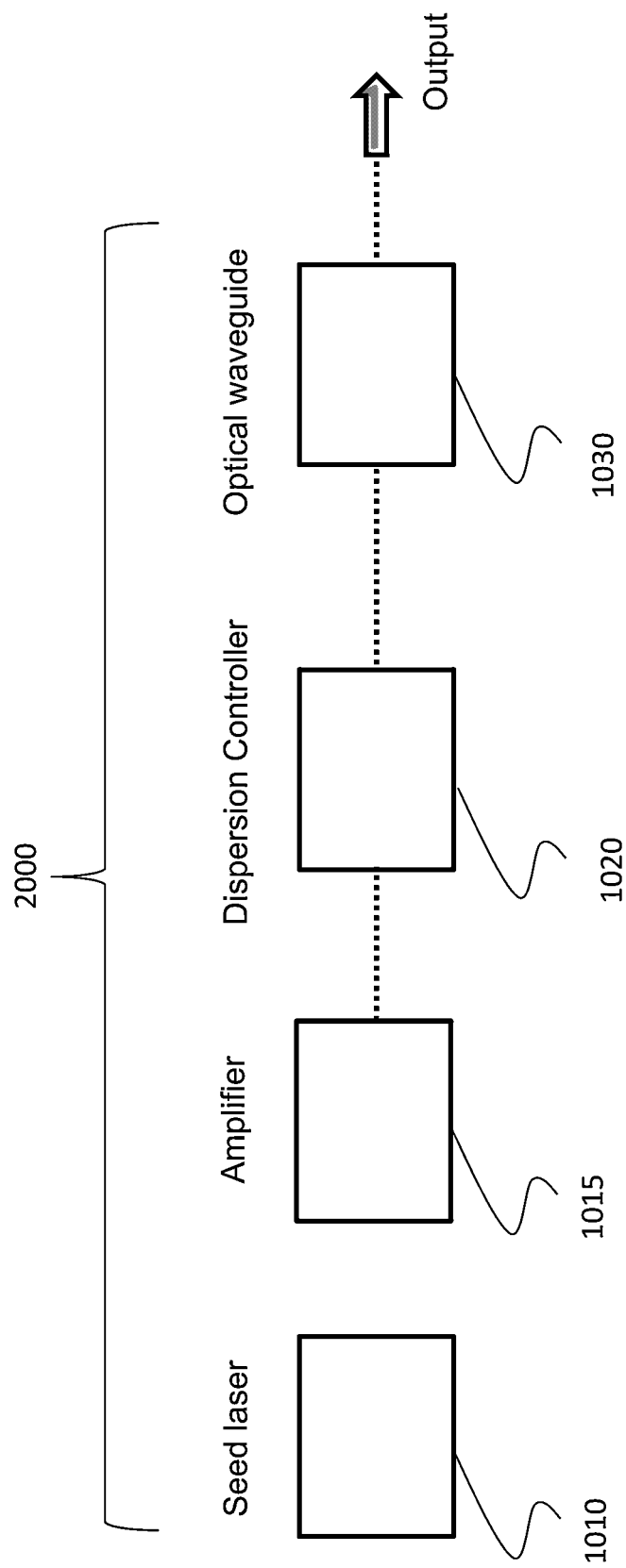
FIG. 4 illustrates a fiber laser system including an amplifier.

The seed laser 1010 can be a pulse laser such as fiber lasers, solid state lasers and intensity modulated CW lasers. If the output power is not strong enough for causing the soliton effect and the Raman effect, a laser amplifier 1015 may be inserted after the seed laser 1010 and before the dispersion controller 1020 as described in FIG. 4. In the present embodiment, the seed laser 1010 and/or an amplifier might be worked as an alternative or additional dispersion (chirping) controller. If the amount of the chirping is sufficient, the dispersion controller 1020 might be omitted.

The dispersion controller 1020 may include a normal dispersion controller, anomalous dispersion controller, or both of them. The examples of the dispersion controller 1020 are an optical fiber, a grating, a prism, a chirped fiber grating, and a dispersion material.

The optical waveguide 1030 needs to have anomalous dispersion for input pulses. This anomalous dispersion waveguide is preferred to be a polarization maintaining fiber. Thus, a polarization controlling devices including wave plates, polarizer or polarization beam splitter may be inserted before the waveguide 1030.

The shift amount of the center of the wavelength due to SSFS is estimated by simulation. For the simulation purpose, the following specific information is used. An erbium-doped mode-locked fiber laser and an erbium-doped fiber amplifier can be used as a seed source as the seed laser 1010 and the amplifier 1015 in FIG. 4. The seed source has 50 mW average power, 1560 nm center wavelength, 40 MHz repetition rate, and 200 fs temporal duration pulse. The chirping of the output pulses is controlled by a pair of grating with 900 line/mm. A distance between the gratings is changed from 30 mm to 5 mm. The chirped pulse is coupled to a polarization-maintaining single mode fiber (PM-SMF). The PM-SMF has a dispersion of −20.4 [ps^2/km], a mode field diameter (MFD) of 10 um and a length of 15 m. The center wavelength and the average power of the output from PM-SMF are 1600 nm to 1720 nm and 30 mW to 45 mw, respectively. If the chirping amount of the pulse is not controlled, the center wavelength of output pulse can't be tuned and just 1740 nm.

A condition to generate SSFS (i.e., wavelength modulation by the non-linear effect on soliton) is described above as one example. Other examples can be obtained by using computational simulation based on split-step Fourier method which is a pseudo-spectral numerical method used to solve nonlinear partial differential equations (i.e., nonlinear Schrödinger equation).

EXAMPLE 1

Figure 5:
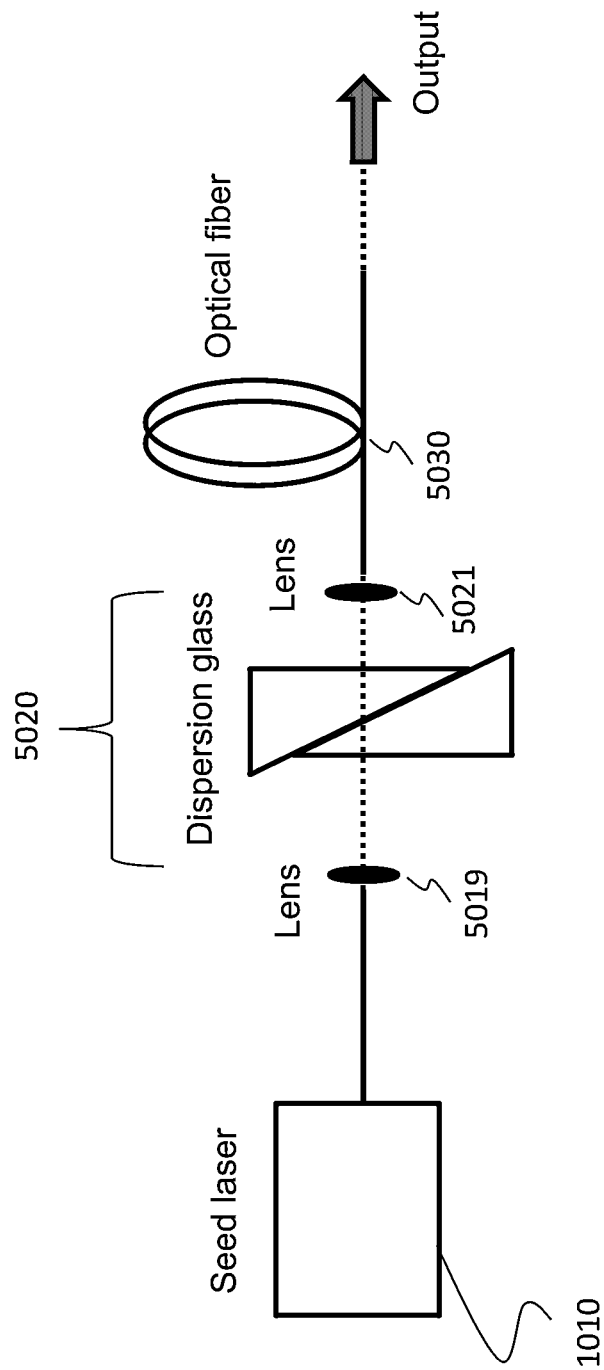
FIG. 5 illustrates a fiber laser system described in an example 1.

In FIG. 5, a Seed laser 1010 is a mode-locked fiber laser. Pulses from laser 1010 are passed through a lens 5019 and become collimated beams. The collimated beams propagate to a dispersion controller 5020 composed of dispersion glasses, and the dispersion controlled pulses are coupled into the optical fiber 5030 while maintaining the polarization. The pulse goes into the waveguide having anomalous dispersion through lens 5021. The dispersion is controlled by changing the optical path length of dispersion glasses. In the FIG. 5, a two dispersion glasses with tapered portions. The optical length which the pulse propagates can be changed by, for example, moving one of the dispersion glasses downward or upward. Two of the dispersion glass might be moved in different directions.

EXAMPLE 2

Figure 6A:
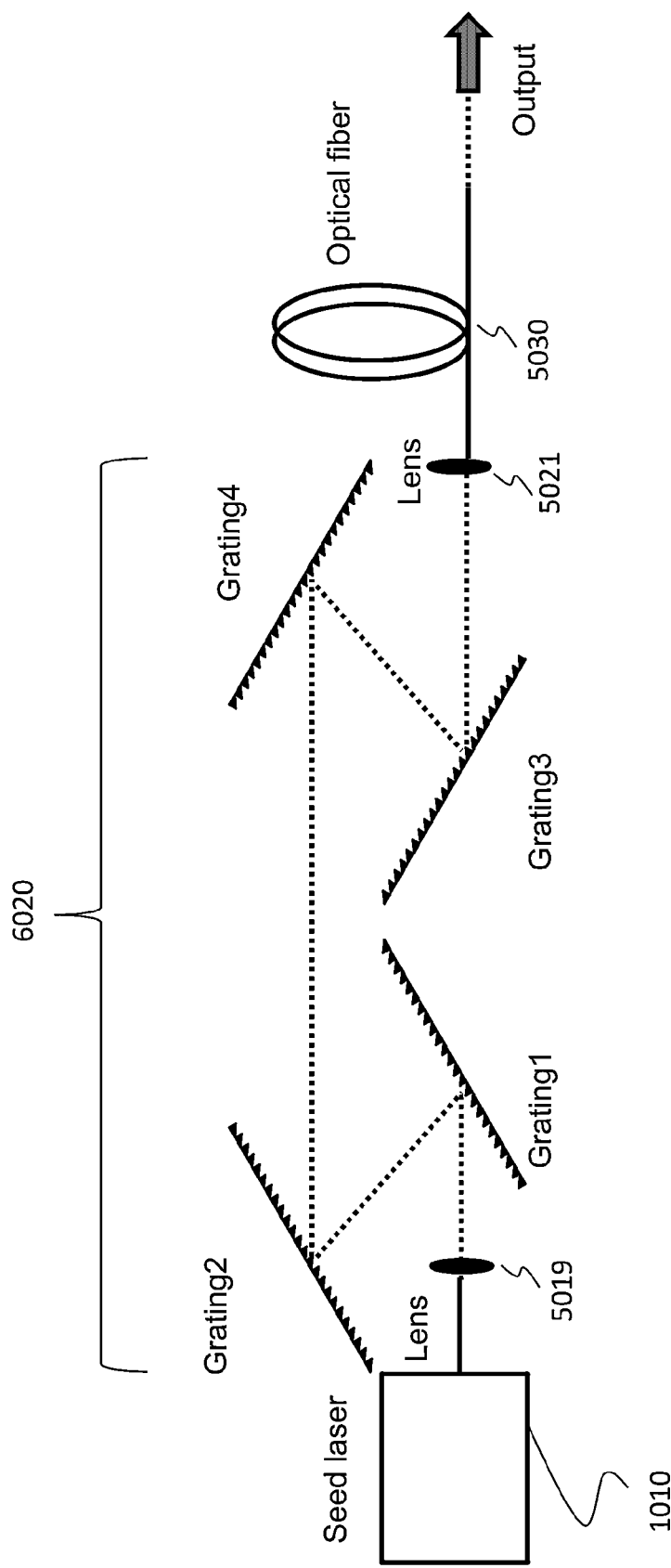
FIG. 6A illustrates a fiber laser system described in an example 2.
Figure 6B:
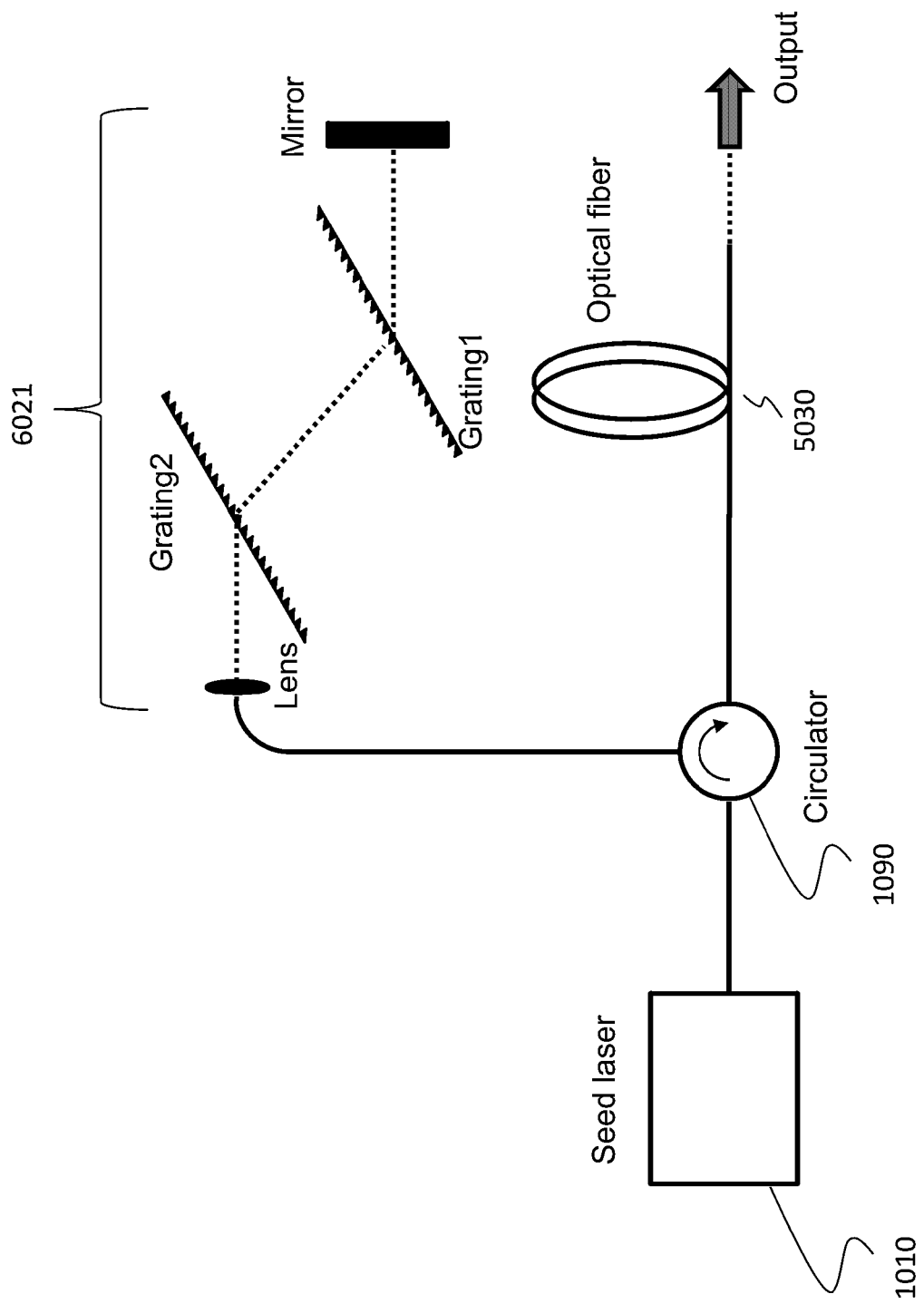
FIG. 6B illustrates a fiber laser system described in an example 2.

In FIG. 6A, a seed laser 1010 and an optical fiber are the same as the above example 1. The part of dispersion controller 6020 consists of a set of gratings (Gratings 1, 2, 3, and 4) which are reflective-type gratings. The dispersion can be controlled by changing the distance between gratings or angle between the collimated beam and the gratings. In general, a grating can give greater dispersion than the dispersion glass. One of another example using a transmission-type grating as a controller 6021 is illustrated in FIG. 6B. The chirping amount to be applied to each pulse can be changed by varying a length between Gratings 1 and 2 and a length between Gratings 3 and 4 simultaneously. The pitch of the grating may be 900 line/mm, for example.

EXAMPLE 3

Figure 7:
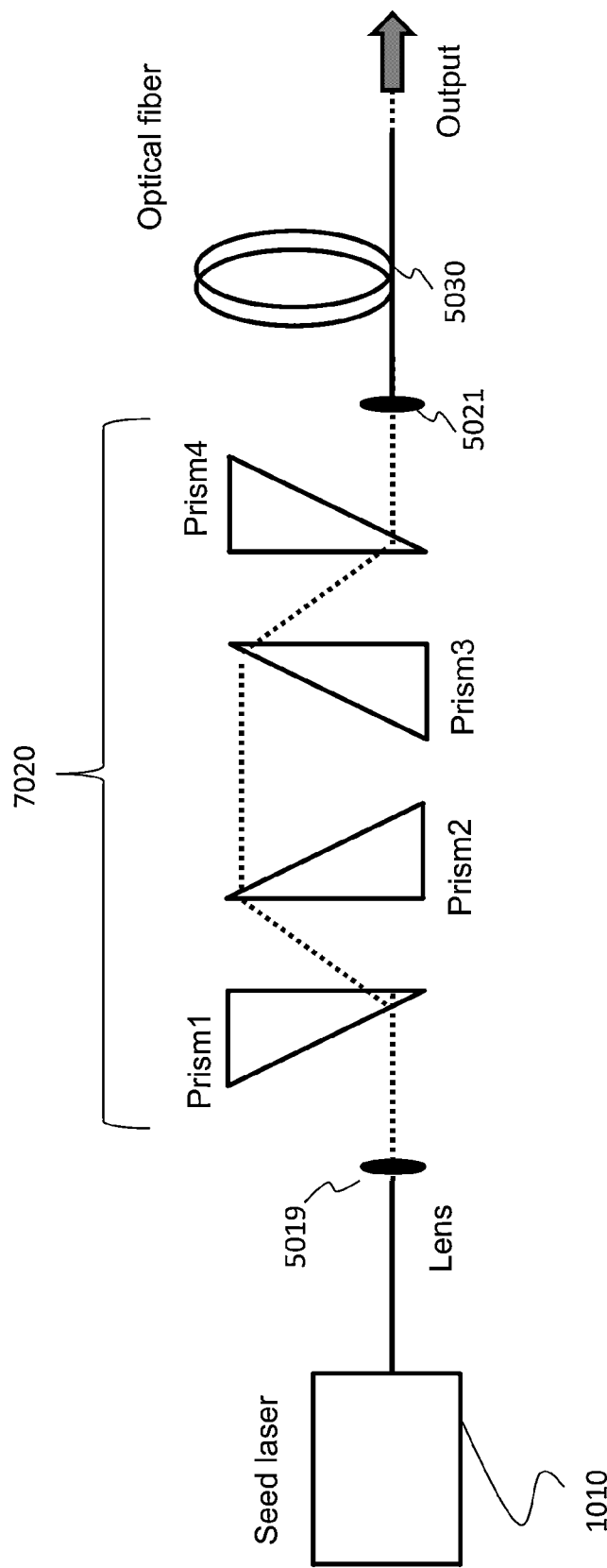
FIG. 7 illustrates a fiber laser system described in an example 3.

In FIG. 7, the seed laser 1010 and the optical fiber 5030 are the same as the example 1. The part of dispersion controller 7020 includes prisms (Prism 1, Prism 2, Prism 3, and Prism 4). The dispersion is controlled by changing the distance between prisms. In general, a prism can control the dispersion by the specific path that the optical pulse passes through the prism. The chirping amount to be applied to each pulse can be changed by moving at least one of the prisms to change the optical path length through which the pulse transmits.

EXAMPLE 4

Figure 8:
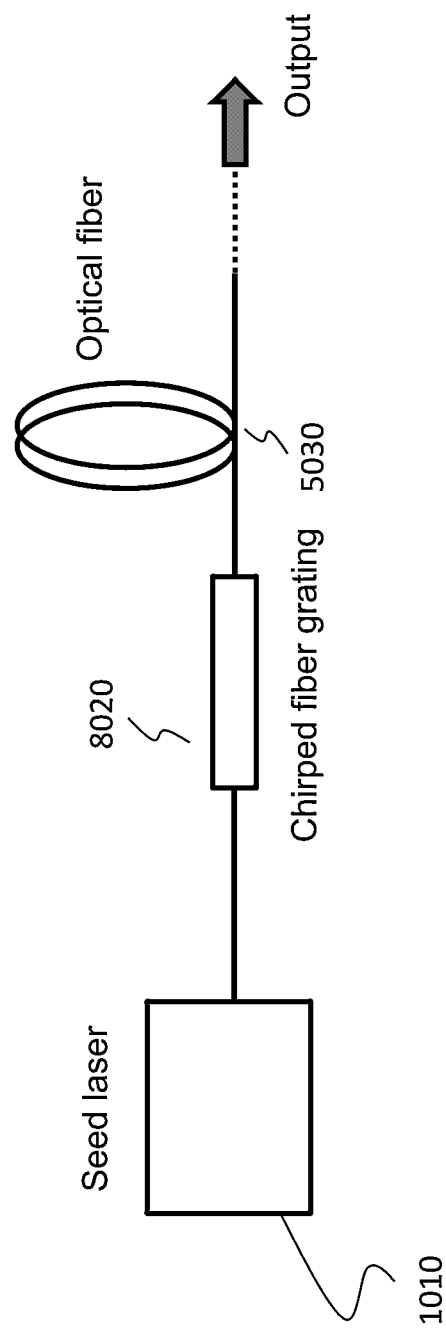
FIG. 8 illustrates a fiber laser system described in an example 4.

In FIG. 8, the seed laser 1010 and optical fiber 5030 are the same as the example 1. The part of dispersion controller 8020 includes a chirped fiber grating. The dispersion is controlled by changing the grating pitch of the chirped fiber grating. By using the chirped fiber grating, there is less free space alignment issues in the system. The chirping amount to be applied to each pulse can be changed by adjusting the temperature of the chirped fiber grating and/or by changing the tension applied to the chirped fiber grating.

EXAMPLE 5

Figure 9:
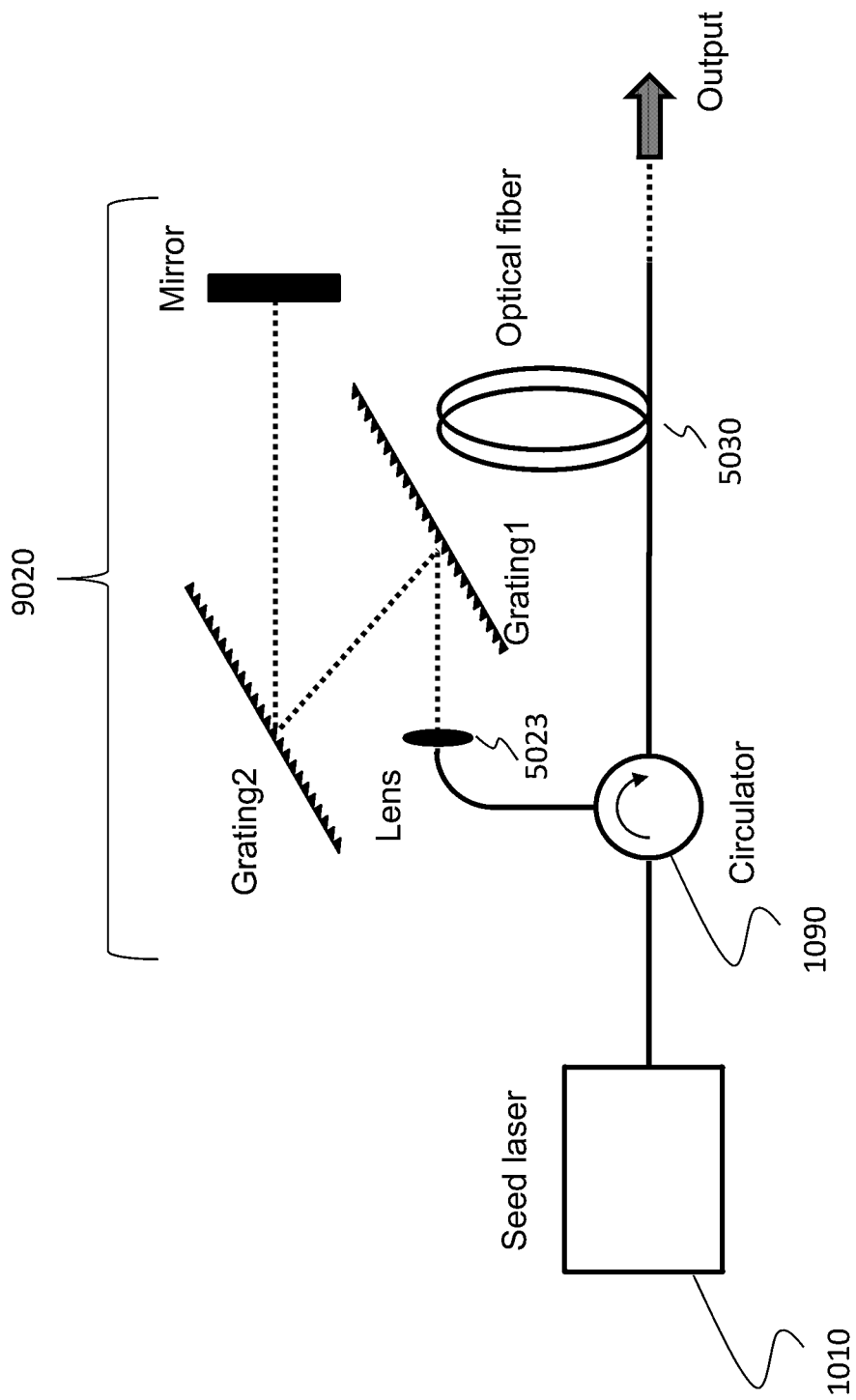
FIG. 9 illustrates a fiber laser system described in an example 5.

In FIG. 9, the seed laser 1010 and the optical fiber 5030 are the same as the example 1. The part of dispersion controller 9020 includes a fiber circulator 1090, gratings (Grating 1 and Grating 2) and a mirror. The dispersion is controlled by changing the distance between gratings or angle between the collimated beam and the gratings. By this diagram, the number of gratings can be reduced. The chirping amount to be applied to each pulse can be changed by changing the incident angle of the pulse to the Gratings 1 and 2.

EXAMPLE 6

Figure 10A:
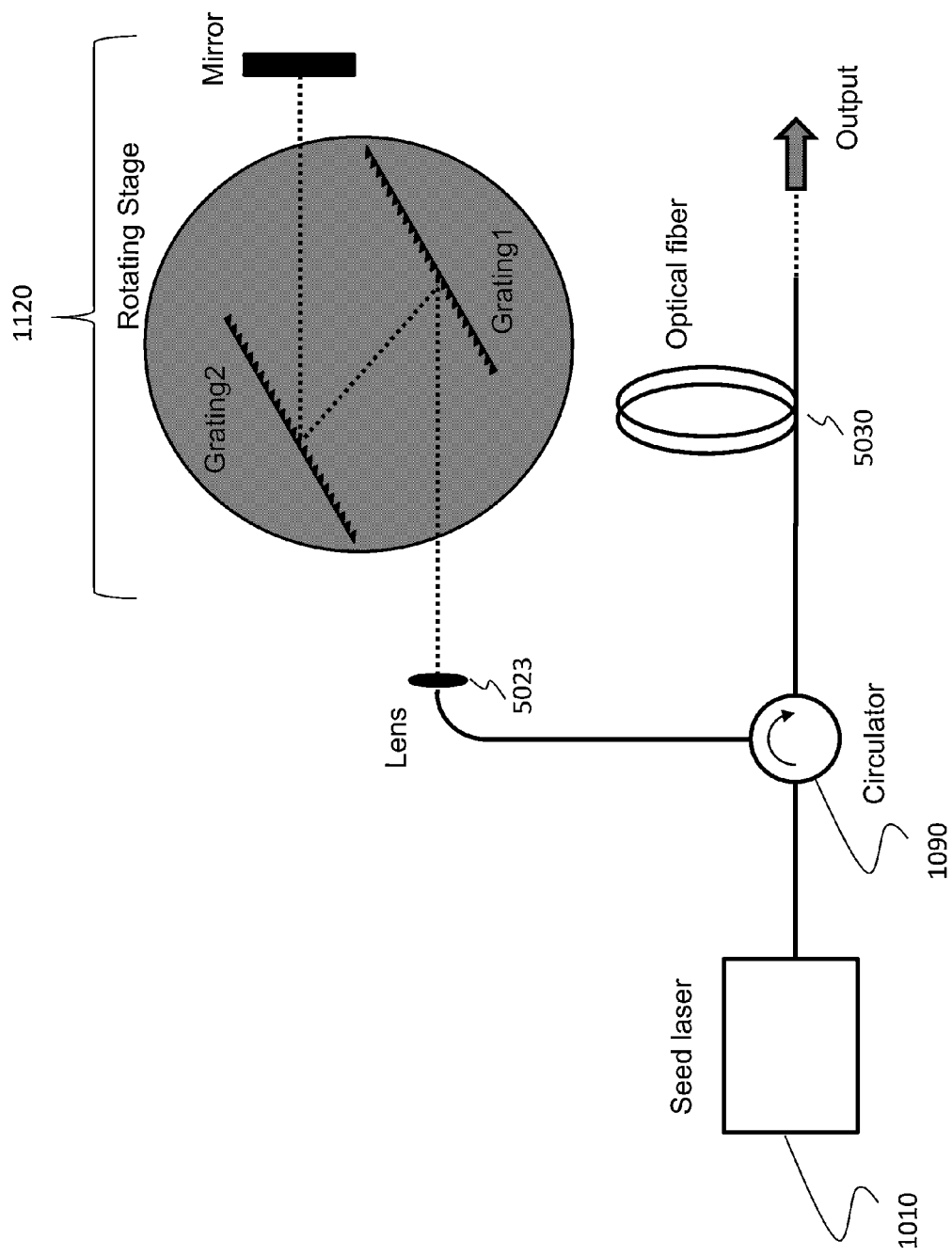
FIG. 10A illustrates a fiber laser system described in an example 6.
Figure 10B:
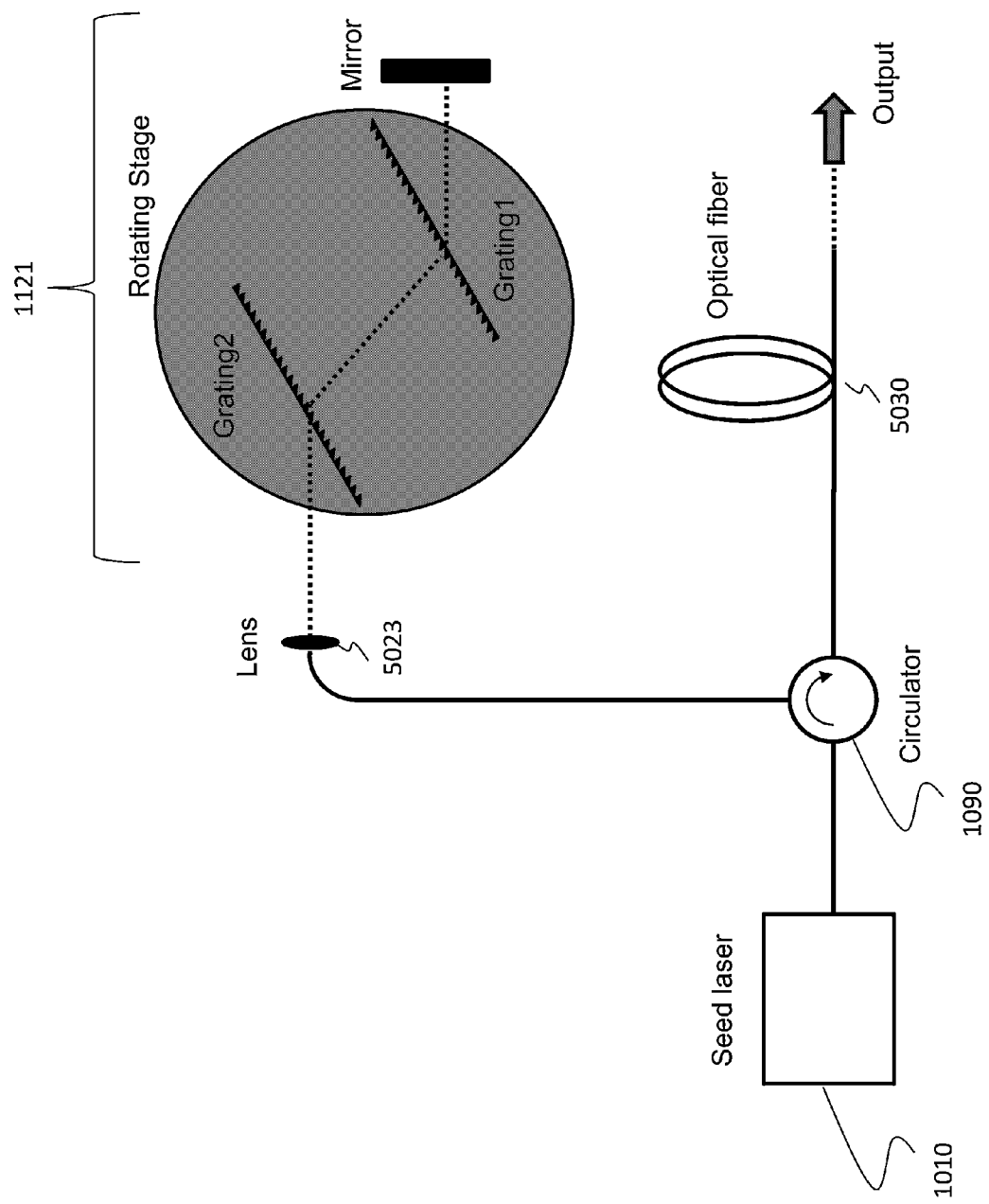
FIG. 10B illustrates a fiber laser system described in an example 6.

In FIG. 10A, the Seed laser 1010 and the optical fiber 5030 are the same as the example 1. The part of dispersion controller 1120 includes a fiber circulator 1090, gratings (Grating 1 and 2) as reflective-type grating, a rotating stage, and a mirror. The rotating stage can be designed to automatically or repeatedly rotate about an axis between −30 degree and +30 degree, for example. The dispersion is controlled by changing the angle between the collimated beam and grating. By this diagram, we can control the dispersion quickly. Instead of the reflective-type grating, the transmission-type gratings are used in FIG. 10B. The chirping amount to be applied to each pulse can be changed by the rotational stage.

EXAMPLE 7

Figure 11:
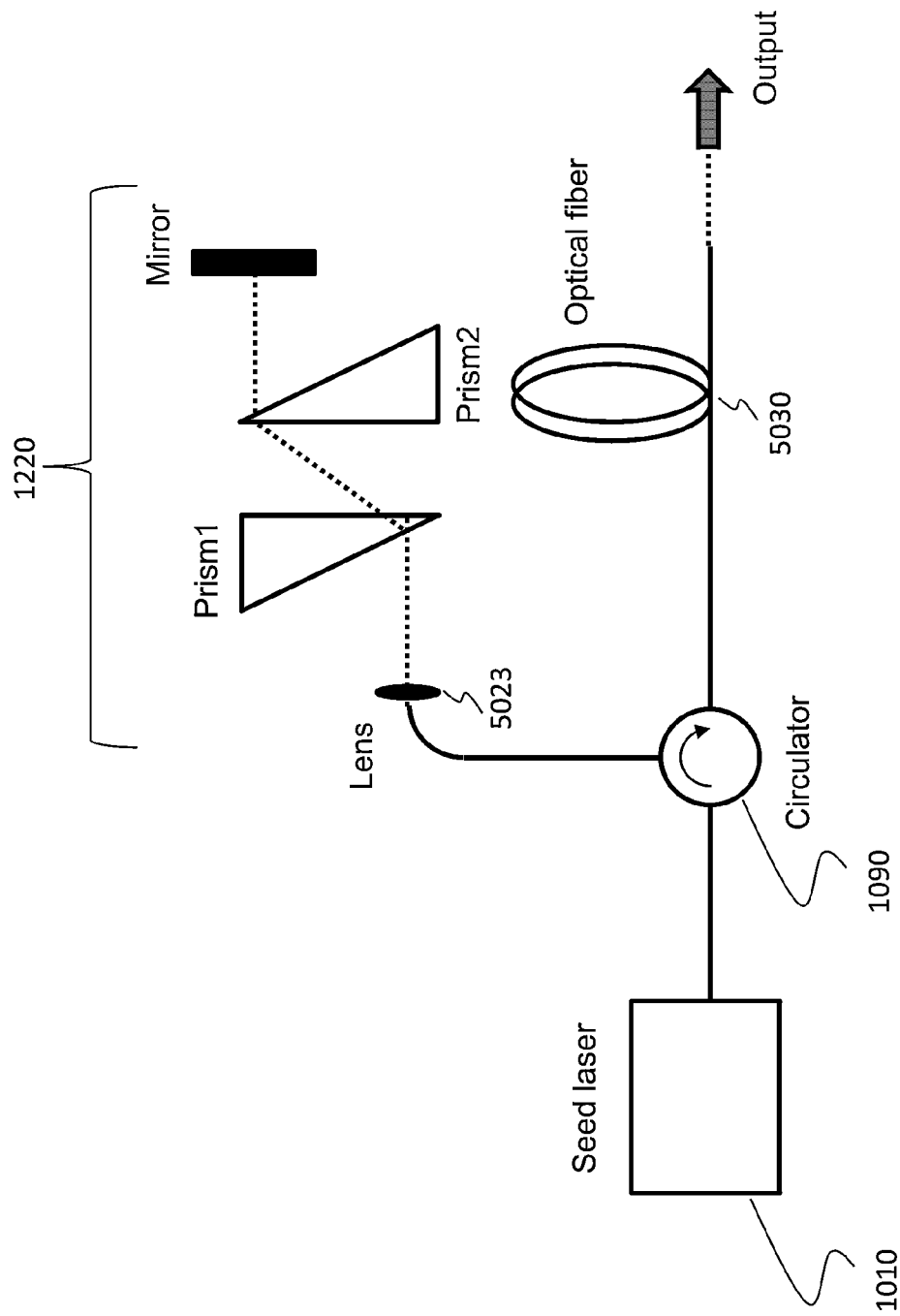
FIG. 11 illustrates a fiber laser system described in an example 7.

In FIG. 11, the seed laser 1010 and the optical fiber 5030 are the same as the example 1. The part of dispersion controller 1220 includes a fiber circulator 1090, prisms (Prism 1, and Prism 2) and a mirror. The dispersion is controlled by changing the distance between prisms. The chirping amount to be applied to each pulse can be changed by moving one of the prisms downward to change the optical path length for the pulse, for example.

EXAMPLE 8

Figure 12:
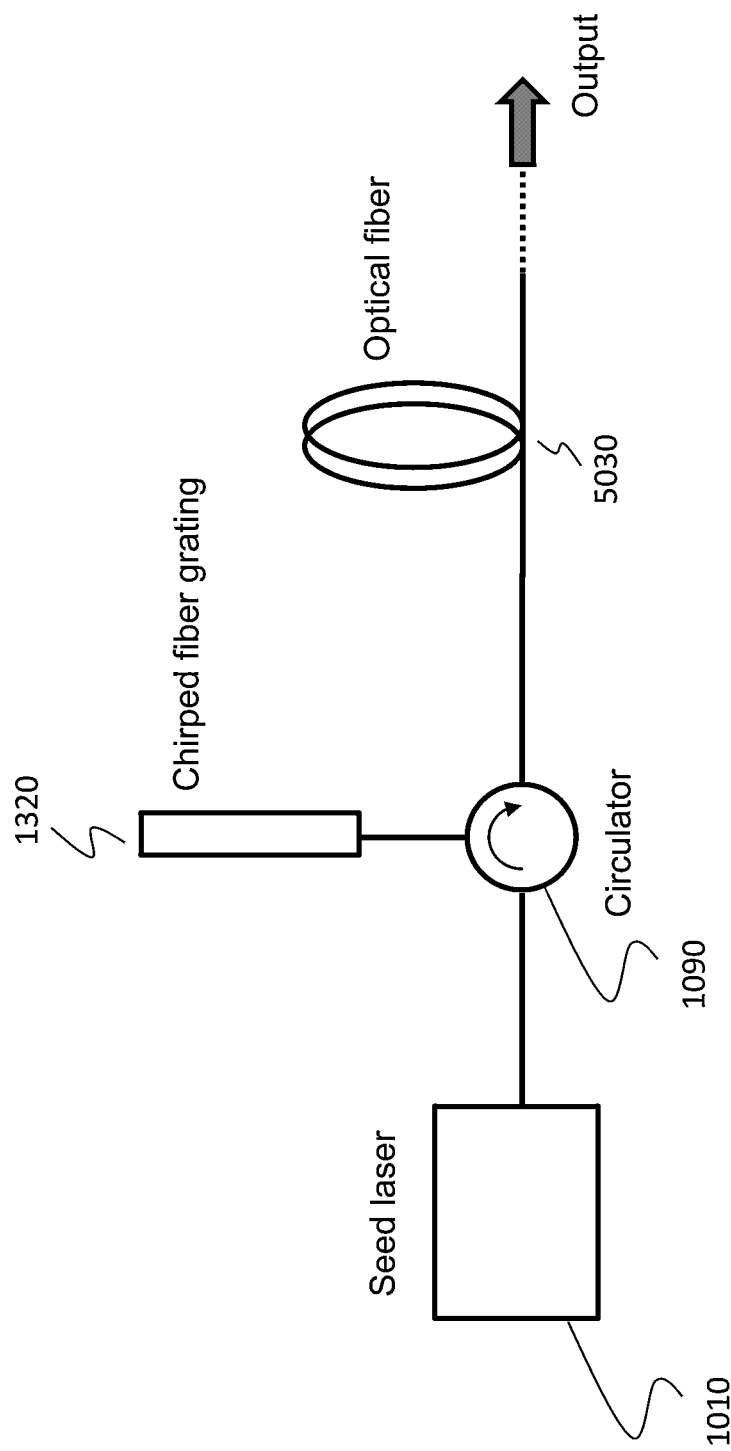
FIG. 12 illustrates a fiber laser system described in an example 8.

In FIG. 12, the Seed laser 1010 and the optical fiber 5030 are the same as the example 1. The part of dispersion controller 1320 includes a fiber circulator 1090 and a chirped fiber grating 1320. The dispersion is controlled by changing the grating pitch of the chirped fiber grating. By this diagram, there is less free space alignment issues and we can also use a reflective type chirped fiber grating. The chirping amount to be applied to each pulse can be changed in the manner discussed in Example 4.

EXAMPLE 9

Figure 13:
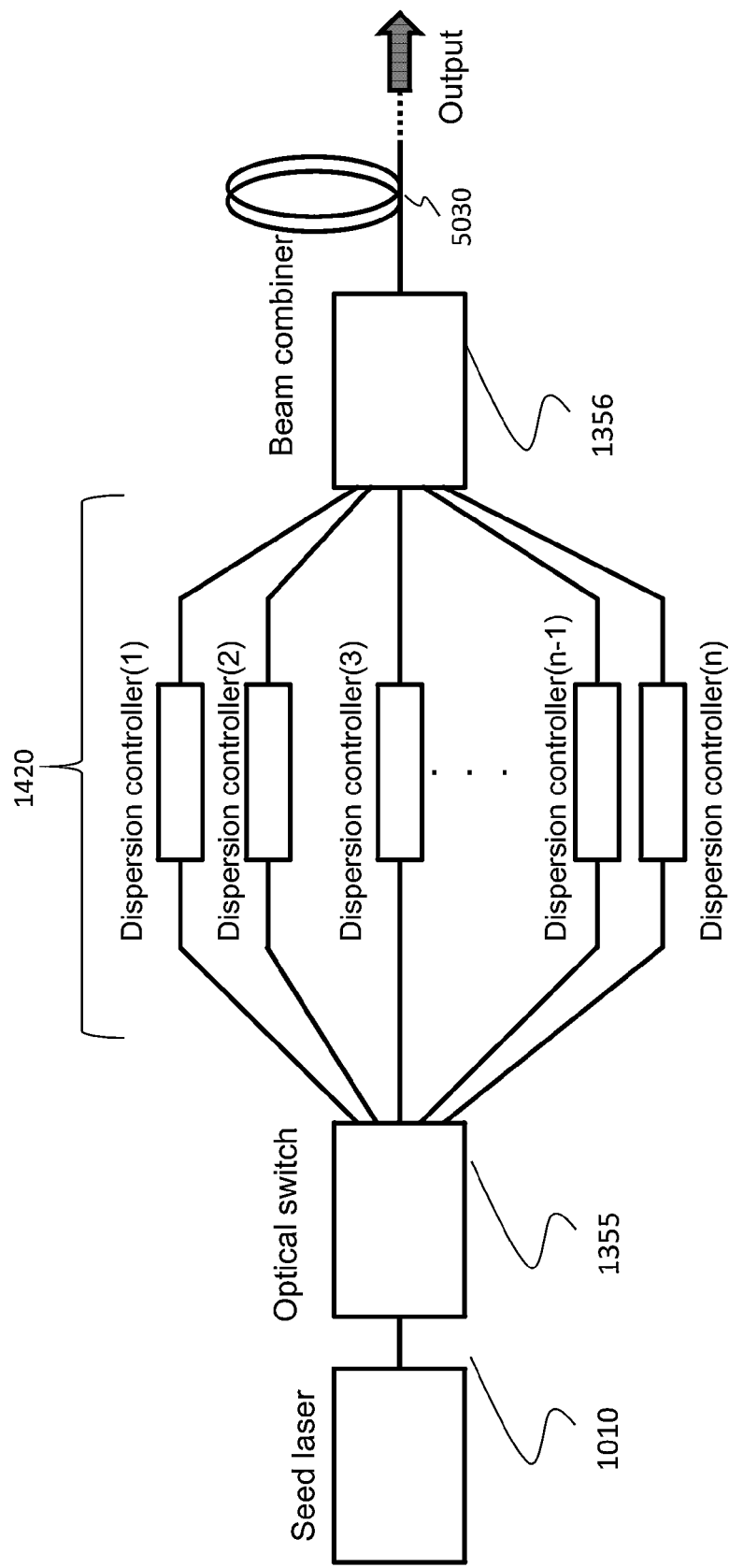
FIG. 13 illustrates a fiber laser system described in an example 9.

In FIG. 13, the seed laser 1010 and the optical fiber 5030 are the same as the example 1. The dispersion is controlled by the different setting of dispersion controller 1420 which includes an optical switch 1355, a plurality of dispersion controller elements having different chirping amount to be provided each other, and a beam combiner 1356. Each dispersion controller elements may include one or more of the grating(s), prism(s), chirped fiber grating(s), dispersion material, and waveguides as described in the above examples. The use of a switch allows for fast adjustment of the chirp and/or allows wider variation in the chirping. The chirping amount to be applied to each pulse can be changed by the optical switch 1355.

EXAMPLE 10

Figure 14:
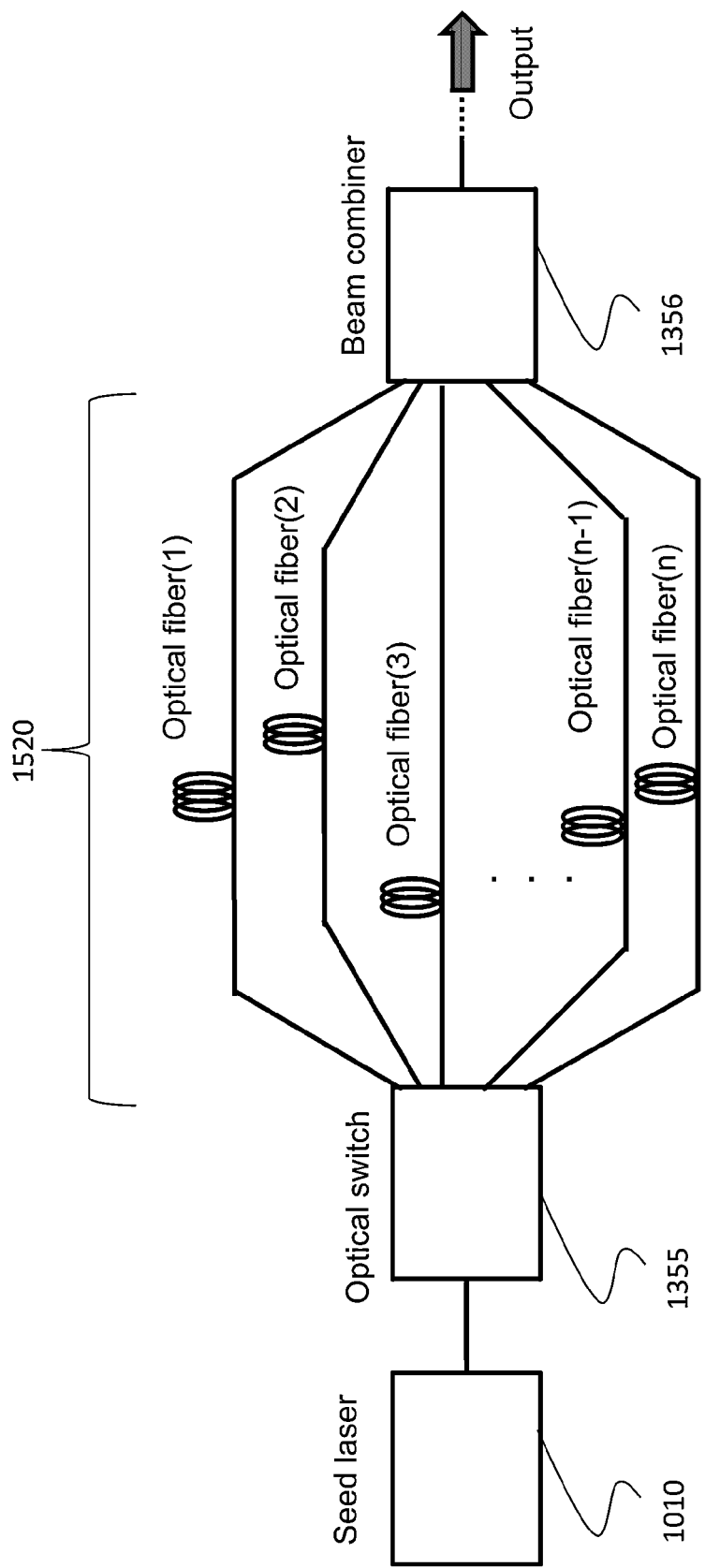
FIG. 14 illustrates a fiber laser system described in an example 10.

In FIG. 14, the seed laser 1010 is the same as the example 1. A dispersion controller 1520 includes an optical switch 1355, a plurality of optical fibers, and a beam combiner 1356 are used. Since the length of the optical fiber is different from each other, the center of the wavelength of the output soliton pulse can be different. The optical switch 1355, the plurality of optical fibers, and the beam controller in FIG. 15 work as a dispersion controller and the waveguide described in FIG. 1. In this system configuration, there are less free space issues and digitalized pulses are generated faster.

As explained above, the present disclosure allows us to reduce the input pulse energy differences between output pulses with different center wavelengths. Thus the optical energy can be used more efficiently.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:
1. A fiber laser system comprising:
a seed laser configured to generate a plurality of optical pulses;
a controller configured to receive the plurality of optical pulses emitted from the seed laser and control an amount of chirping to be applied to each of the plurality of optical pulses to obtain chirped pulses; and an optical waveguide, having a characteristic of anomalous dispersion, configured to receive the chirped pulses emitted from the controller and cause soliton self-frequency shifts while the chirped pulses propagate in the optical waveguide so that a center wavelength of a pulse output from the optical waveguide depends on the amount of chirping in each of the chirped pulses, wherein the center wavelength is a first value when the amount of chirping is a first amount, the center wavelength is a second value when the amount of chirping is a second amount, the first amount is different from the second amount, and the first value is different from the second value, and wherein the optical waveguide has the characteristic of anomalous dispersion with respect to all wavelengths contained in each of the chirped pulses.

2. The optical fiber system according to claim 1, further comprising an amplifier between the seed laser and the controller.

3. The optical fiber system according to claim 1, wherein the controller includes a dispersion glass.

4. The optical fiber system according to claim 1, wherein the controller includes a gratings.

5. The optical fiber system according to claim 1, wherein the controller includes a prism.

6. The optical fiber system according to claim 1, wherein the controller includes a chirped fiber grating.

7. The optical fiber system according to claim 4, further comprising a rotating stage.

8. The optical fiber system according to claim 3, wherein the dispersion glass includes two dispersion glasses, and the controller changes the amount of chirping by changing an optical path length of the two dispersion glasses through which a pulse propagates.

9. The optical fiber system according to claim 4, wherein the grating includes a plurality of gratings, and wherein the controller changes the amount of chirping by changing a distance between the plurality of gratings or an angle between an incident pulse and the plurality of gratings.

10. The optical fiber system according to claim 5, wherein the prism includes a plurality of prisms, and wherein the controller changes the amount of chirping by changing a distance between the plurality of prisms.

11. The optical fiber system according to claim 6, wherein the controller changes the amount of chirping by changing a grating pitch of the chirped fiber grating.

12. The optical fiber system according to claim 6, wherein the controller changes the amount of chirping by adjusting a temperature of the chirped fiber grating.

13. The optical fiber system according to claim 6, wherein the controller changes the amount of chirping by changing a tension applied to the chirped fiber grating.

14. The optical fiber system according to claim 7, wherein the controller changes the amount of chirping by changing an angle between an incident pulse and the grating.

15. The fiber laser system according to claim 1, wherein the optical waveguide is configured to allow each of the chirped pulses to be input into the optical waveguide without changing energy of each of the chirped pulses according to the amount of chirping in each of the chirped pulses.

* * * * *